US011230912B2

(12) United States Patent
Moberg et al.

(10) Patent No.: US 11,230,912 B2
(45) Date of Patent: Jan. 25, 2022

(54) ROTATION ANGLE SENSING AND ADVANCED DIAGNOSTICS

(71) Applicants: Caterpillar Global Mining Equipment LLC, Denison, TX (US); Caterpillar Global Mining HMS GmbH, Dortmund (DE)

(72) Inventors: Carl J. Moberg, Dunlap, IL (US); Timo Diekmann, Castrop-Rauxel (DE)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 16/800,406

(22) Filed: Feb. 25, 2020

(65) Prior Publication Data
US 2021/0262334 A1 Aug. 26, 2021

(51) Int. Cl.
*E21B 44/00* (2006.01)
*E21B 47/01* (2012.01)
*G01B 7/30* (2006.01)

(52) U.S. Cl.
CPC .............. *E21B 44/00* (2013.01); *E21B 47/01* (2013.01); *G01B 7/30* (2013.01)

(58) Field of Classification Search
CPC ............ E21B 44/00; E21B 47/01; G01B 7/30
See application file for complete search history.

(56) References Cited

U.S. PATENT DOCUMENTS

| 3,613,805 | A | 10/1971 | Lindstad et al. |
| 3,881,375 | A | 5/1975 | Kelly |
| 5,242,020 | A | 9/1993 | Cobern |
| 5,343,962 | A | 9/1994 | Daigle et al. |
| 5,821,743 | A | 10/1998 | Page, Jr. et al. |
| 8,490,717 | B2 | 7/2013 | Bergstrom et al. |
| 8,781,744 | B2 | 7/2014 | Ekseth et al. |
| 10,132,157 | B2 | 11/2018 | Kuckes |
| 2012/0205154 | A1* | 8/2012 | Lozinsky .............. E21B 47/024 175/45 |
| 2014/0338975 | A1 | 11/2014 | Hoult et al. |
| 2016/0215614 | A1* | 7/2016 | Song ........................ G01V 1/48 |

\* cited by examiner

*Primary Examiner* — Dany E Akakpo
(74) *Attorney, Agent, or Firm* — von Briesen & Roper, s.c.

(57) ABSTRACT

A drill string rotation angle sensor diagnostic system includes a first rotation angle sensor assembly, a second rotation angle sensor assembly, an operator interface; and a control module. The control module is configured to receive a first signal from the first rotation angle sensor assembly, receive a second signal from the second rotation angle sensor assembly, determine if a valid state exists based on the first signal and the second signal, and indicate a fault on the operator interface if a valid state does not exist.

17 Claims, 12 Drawing Sheets

ROTATION ANGLE SENSING AND ADVANCED DIAGNOSTICS

TECHNICAL FIELD

The present disclosure relates generally to mobile drilling machines and more specifically to systems and methods for diagnostics in rotation sensors for such drilling machines.

BACKGROUND

Mobile drilling machines, such as blasthole drilling machines, are typically used for drilling blastholes for mining, quarrying, dam construction, and road construction, among other uses. The process of excavating rock, or other material, by blasthole drilling comprises using the blasthole drill machine to drill a plurality of holes into the rock and filling the holes with explosives. The explosives are detonated causing the rock to collapse. The rubble of the collapse is then removed and the new surface that is formed is reinforced. Many current blasthole drilling machines utilize rotary drill rigs, mounted on a mast, that can drill blastholes anywhere from 6 inches to 22 inches in diameter and depths up to 180 feet or more.

In order to drill to deeper depths, it is often necessary to add additional pipe segments to extend the drill string. When doing so, a rotary head of the drill string is disconnected from the lower pipe segments and raised to allow a new pipe segment to be rotated into line with the string. During this process, it is important to ensure the correct rotational alignment of each pipe segment with the rest of the drill string and with the drilling machine as a whole. Therefore, it is necessary to have accurate means of monitoring the rotational position of the drill string. This monitoring can be performed by means of arc sensors and magnet sets. However, like most sensors, this system can sometimes malfunction. There is therefore a need for a method of quickly and accurately diagnosing and troubleshooting the sensing system.

The prior art has failed to adequately address this issue. Many drilling machines, such as that disclosed by U.S. Publication No. 2014/0338975 to Hoult, utilize magnetic rotation sensors. Hoult uses magnetic sensors to determine the location of a drill head. However, none of these systems provide the diagnostic verification needed.

SUMMARY OF THE DISCLOSURE

According to one aspect of the present disclosure, a drill string rotation angle sensor diagnostic system is disclosed. The diagnostic system includes a first rotation angle sensor assembly, a second rotation angle sensor assembly, an operator interface, and a control module. The control module is configured to receive a first signal from the first rotation angle sensor assembly, receive a second signal from the second rotation angle sensor assembly, determine if a valid state exists based on the first signal and the second signal, and indicate a fault on the operator interface if a valid state does not exist.

According to another aspect of the present disclosure, a method of diagnostics for a drill string rotation angle sensing system is disclosed. The method comprises receiving a first signal from a first rotation angle sensor assembly, receiving a second signal from a second rotation angle sensor assembly, determining if a valid state exists based on the first signal and the second signal, and indicating a fault on an operator interface if a valid state does not exist.

According to yet another aspect of the present disclosure, a drilling machine is disclosed. The drilling machine includes a frame, a mast mounted on the frame, a rotary head movably mounted on the mast, a drill string coupled to the rotary head and aligned within the mast, a first rotation angle sensor assembly monitoring a rotational position of the drill string, a second rotation angle sensor assembly monitoring the rotational position of the drill string, an operator interface, and a control module. The control module is configured to receive a first signal from the first rotation angle sensor assembly, receive a second signal from the second rotation angle sensor assembly, determine if a valid state exists based on the first signal and the second signal, and indicate a fault on the operator interface if a valid state does not exist.

These and other aspects and features of the present disclosure will be more readily understood after reading the following detailed description in conjunction with the accompanying drawings.

DETAILED DESCRIPTION

Figure 1:
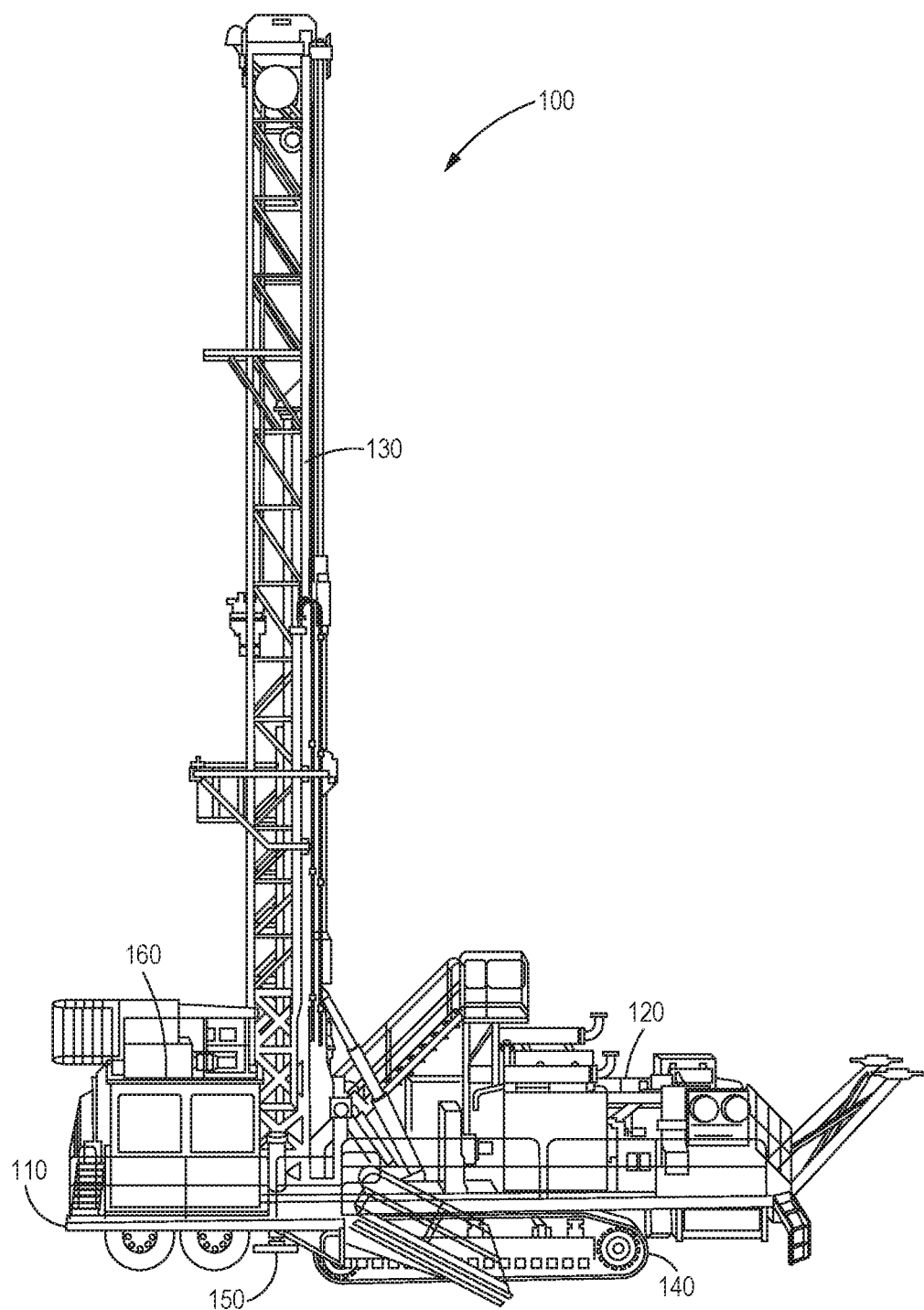
FIG. 1 is a side view of one embodiment of a drilling machine according to one embodiment of the present disclosure.

Referring now to the drawings, and with specific reference to FIG. 1, an exemplary drilling machine according to the present disclosure is referred to by reference numeral 100. Specifically, FIG. 1 depicts a rotary blasthole drilling machine. As shown in FIG. 1, the rotary blasthole drilling machine 100 includes a frame 110, an engine 120, and a drilling mast 130. The frame 110 is supported on a ground surface by a transport mechanism 140, such as crawler tracks. The transport mechanism 140 allows the drilling machine 100 to maneuver across a ground surface to a desired location for a drilling operation. The frame 110 may further include one or more jacks 150 for supporting and leveling the machine 100 on the ground surface during the drilling operation. The frame 110 also supports machinery such as motors, batteries, pumps, air compressors, hydraulic fluid storage and any other equipment necessary to power and operate the drilling machine 100 and not specifically numbered. The frame 110 also supports an operator cab 160 from which a user or operator may maneuver and control the drilling machine 100 via operator interfaces and displays not shown.

Figure 2:
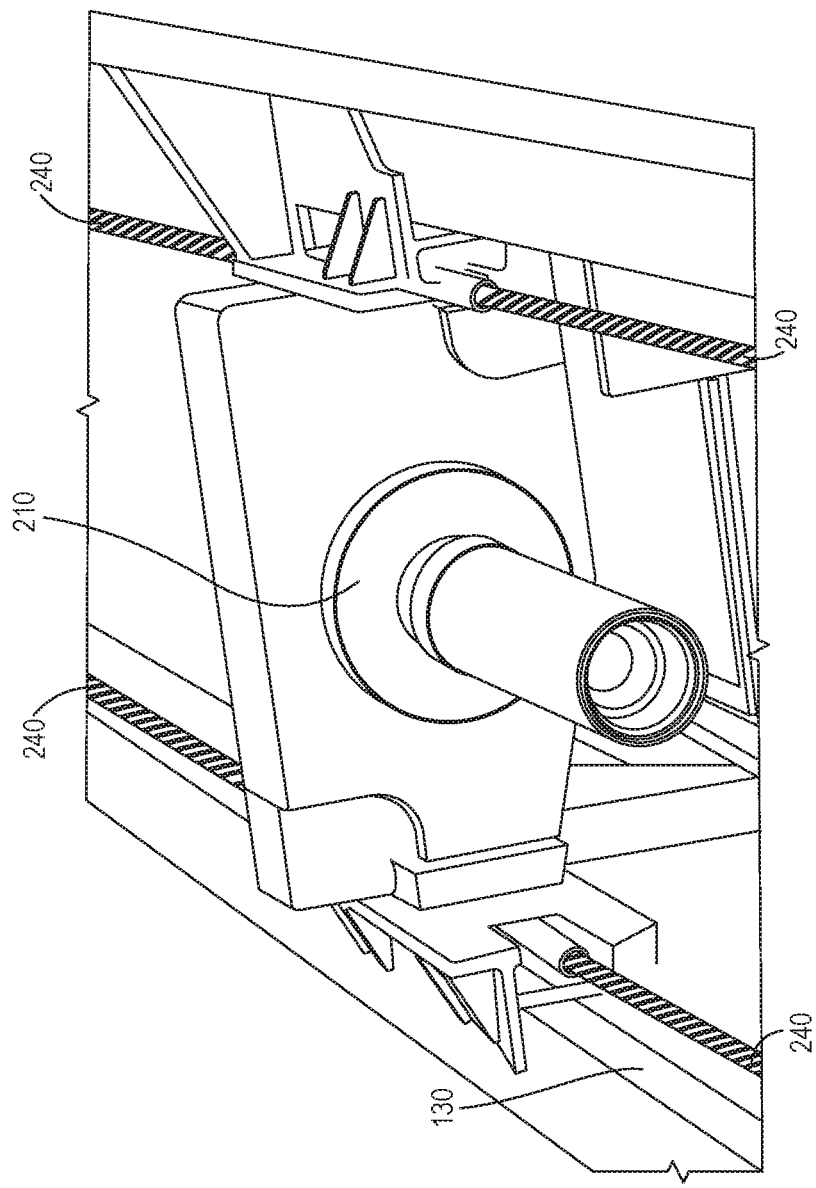
FIG. 2 is a perspective view of a rotary head and a portion of mast frame of the drilling machine of FIG. 1.

FIG. 2 depicts a portion of the drilling mast. The drilling mast 130 supports a rotary head 210. The rotary head 210 is movably mounted on the mast 130 and couples to an upper end of a drill string 220 (not shown). A lower end of the drill string 220 connects to a drill bit 230 (not shown) or other drill tool. During operation of the drilling machine 100, the rotary head 210 rotates the drill string 220 about a longitudinal axis, thereby rotating the drill bit 230 in order to create a hole of the desired size and depth. Hydraulics or similar means may be used to rotate the rotary head 210. The rotary head 210 is hoisted and lowered along the mast 130 by a cable system 240 connected to a hydraulic cylinder 250 (not shown). Controlling the extension of the hydraulic cylinder 250 (not shown) controls the height of the rotary head 210. An operator can direct the hoisting and lowering of the rotary head 210 from the operator cab 160 through a joystick or other similar means.

Figure 3:
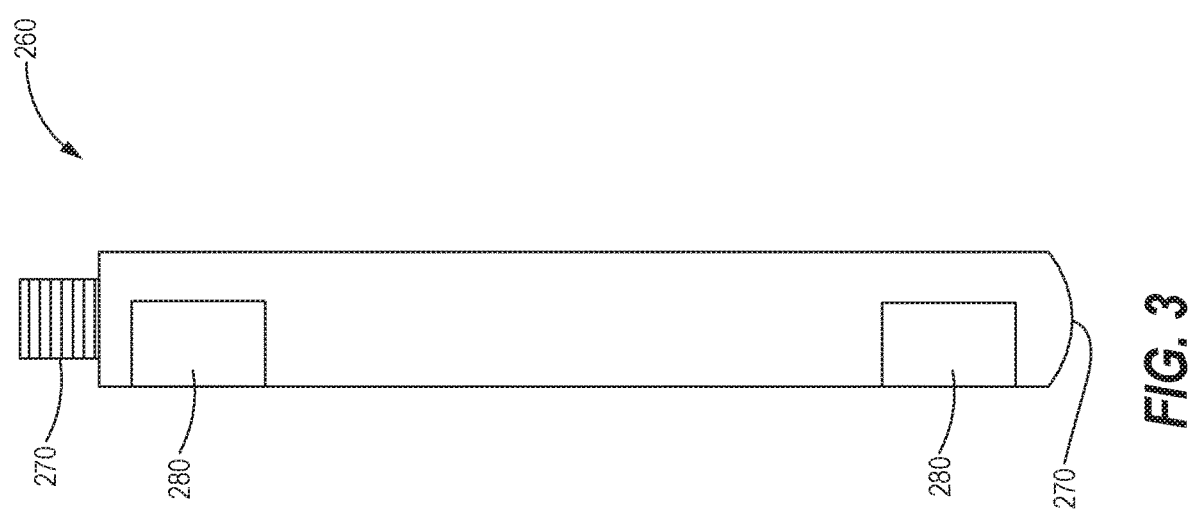
FIG. 3 is a perspective view of a pipe segment according to one embodiment of the present disclosure.

Furthermore, in order to allow the drill string 220 to extend or shorten, the drill string 220 may be made up of a plurality of pipe segments 260. An exemplary pipe segment is depicted in FIG. 3. Each pipe segment 260 has a threaded coupling at each end. In one embodiment, the threaded coupling 270 at a top end of each pipe segment 260 may be a male threading and the threaded coupling at a lower end of each pipe segment 260 may be a female threading. The pipe segment 260s also have a slightly recessed flattened section 280 proximate to the threaded coupling 270 at both ends. This flattened section 280 allows for the pipe segment 260 to be securely held such that rotation is prevented.

Figure 4:
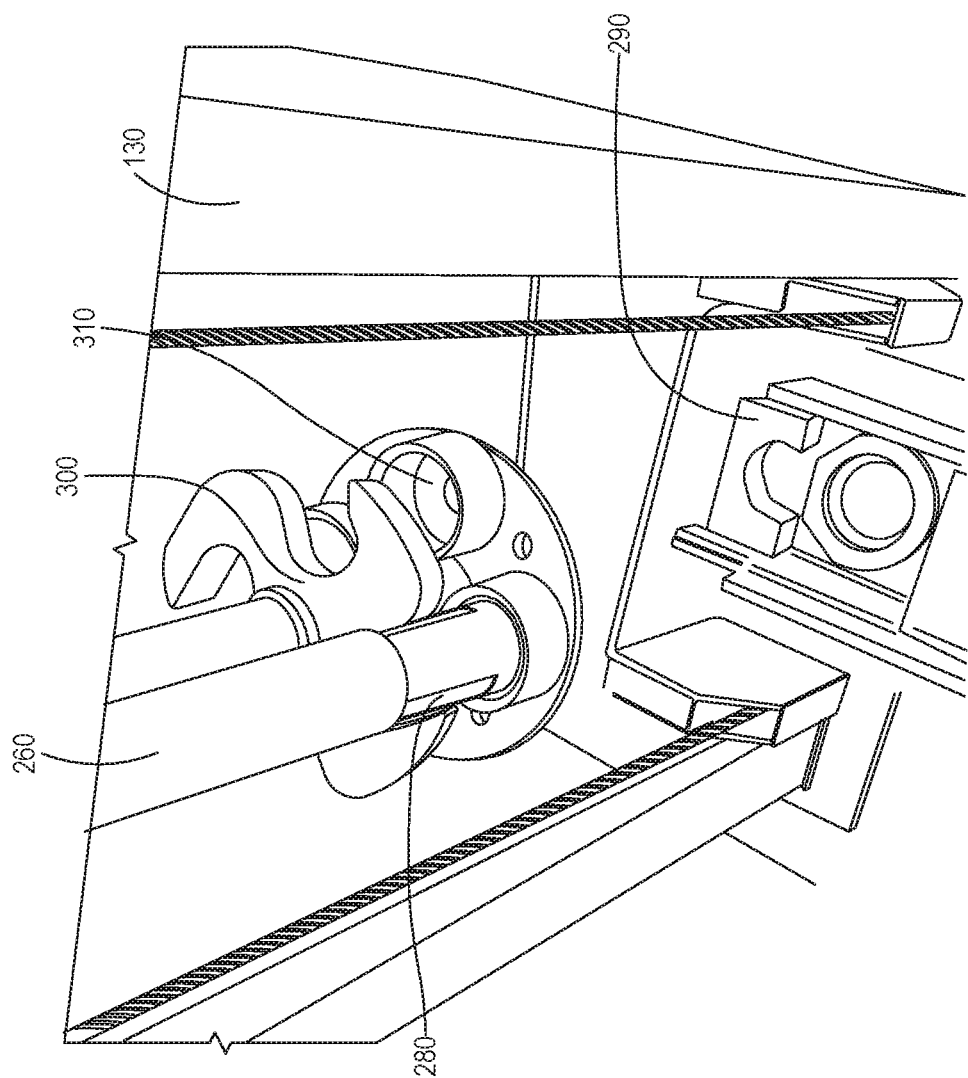
FIG. 4 is a side view of a lower portion of the mast of the drilling machine of FIG. 1 depicting a deck wrench and pipe loading assembly.

FIG. 4 depicts a lower portion of the mast 130 of the drilling machine 100 of FIG. 1 including a deck wrench 290 and pipe loading assembly 300. The deck wrench 290 is located at the bottom of the mast 130 and is configured to fit around a pipe at the flattened section 280 to prevent rotation. The deck wrench 290 moves into line with the drill string 220 and prevents rotation in order to allow the rotary head 210 or pipe segments 260 to be unscrewed from lower portions of the drill string 220.

Additional pipe segments 260 are used for extending the drill string 220 to allow a deeper hole to be drilling. These additional pipe segments 260 are each stored in a pipe storage slot 310 in at least one pipe loader assembly 300. The pipe loader assemblies 300 are located on the mast 130 adjacent to the rotary head 210 and aligned with the drill string 220. The pipe loader assemblies 300 are configured to move a pipe segment 260 in line with the rotary head 210 and drill string 220. The pipe loader assemblies 300 can also take a removed pipe segment 260 from the drill string 220 and move it into a pipe storage slot 310. To aid in moving pipe segments 260 and connecting them to the drill string 220, the pipe loader assemblies 310 are configured to hold pipe segments 260 securely at the flattened section 280 and prevent rotation. Each pipe loader assembly 300 has at least one pipe storage slot 310. However, in some embodiments, a pipe loader assembly 300 may have additional pipe storage slots 300 in a rotating pipe carousel. This embodiment is depicted in FIG. 4. Moreover, in some embodiments, there may be multiple pipe loader assemblies 300 located at different heights up the mast 130.

Figure 6:
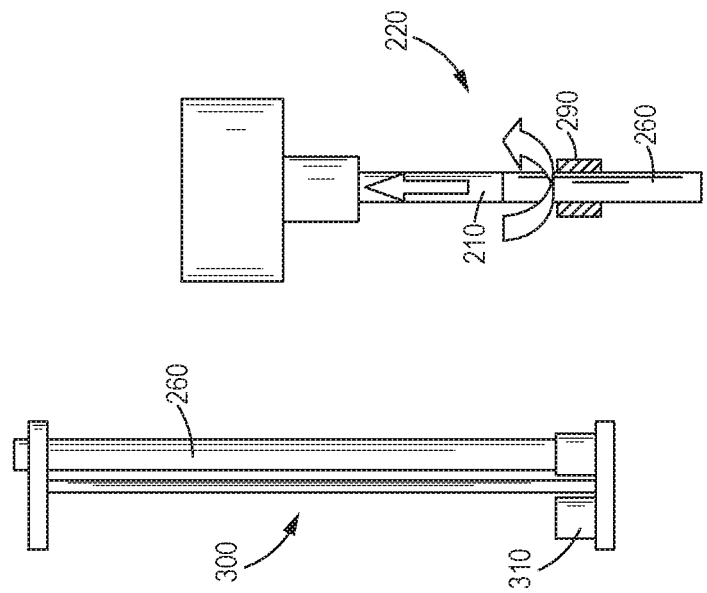
FIG. 6 is a schematic image of a drill string and pipe loader assembly of FIG. 1 in a second stage of the pipe addition process, according to the present disclosure.
Figure 5:
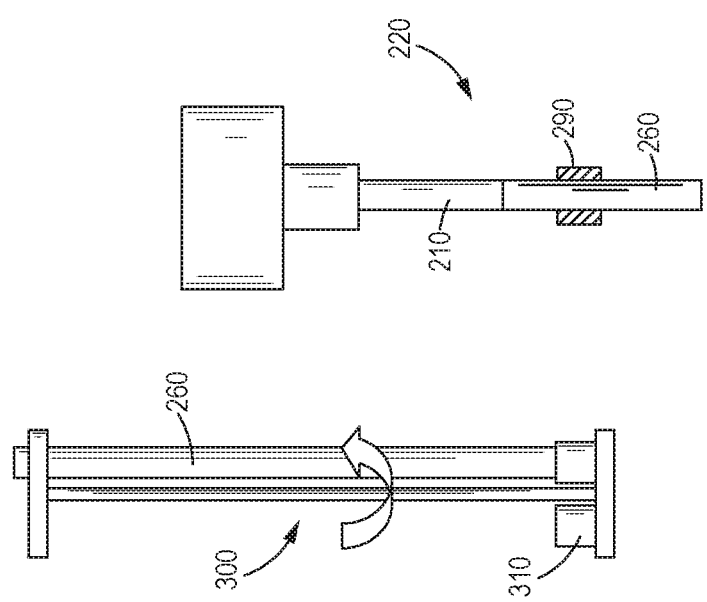
FIG. 5 is a schematic image of a drill string and pipe loader assembly of FIG. 1 in a first stage of the pipe addition process, according to the present disclosure.
Figure 8:
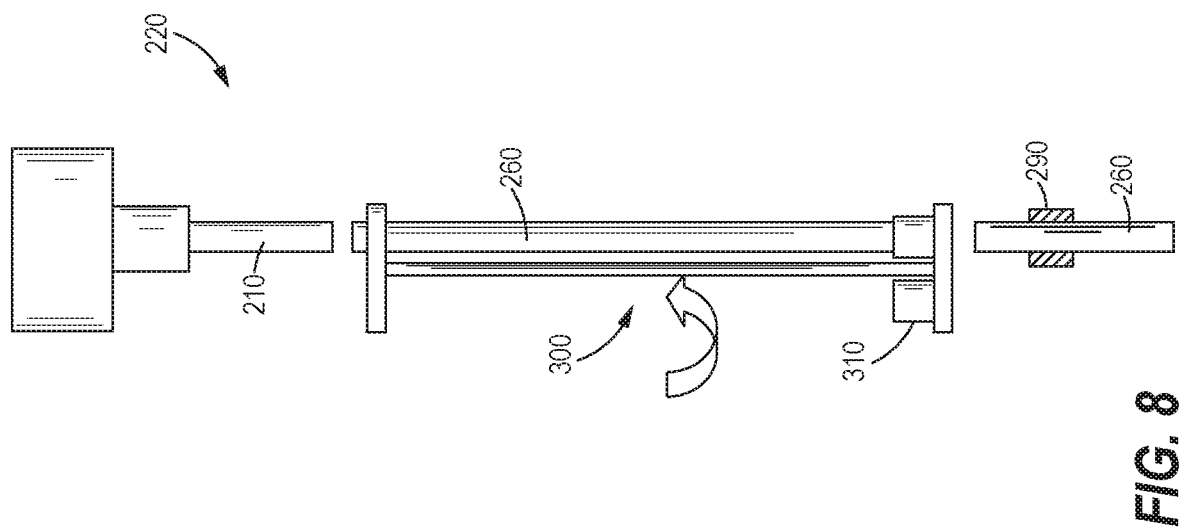
FIG. 8 is a schematic image of a drill string and pipe loader assembly of FIG. 1 in a fourth stage of the pipe addition process, according to the present disclosure.
Figure 7:
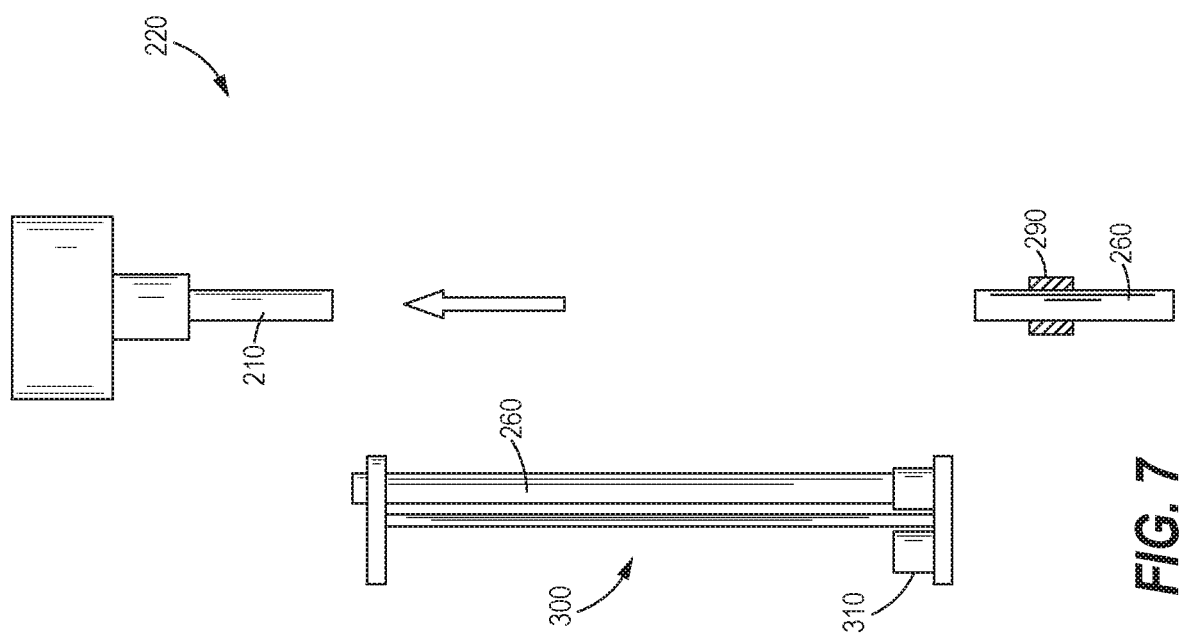
FIG. 7 is a schematic image of a drill string and pipe loader assembly of FIG. 1 in a third stage of the pipe addition process, according to the present disclosure.
Figure 10:
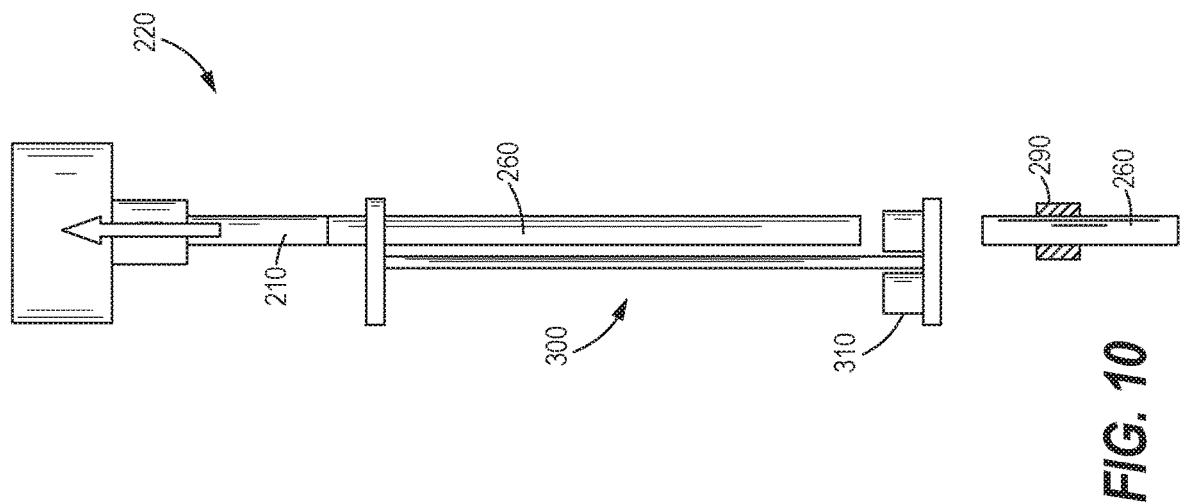
FIG. 10 is a schematic image of a drill string and pipe loader assembly of FIG. 1 in a sixth stage of the pipe addition process, according to the present disclosure.
Figure 9:
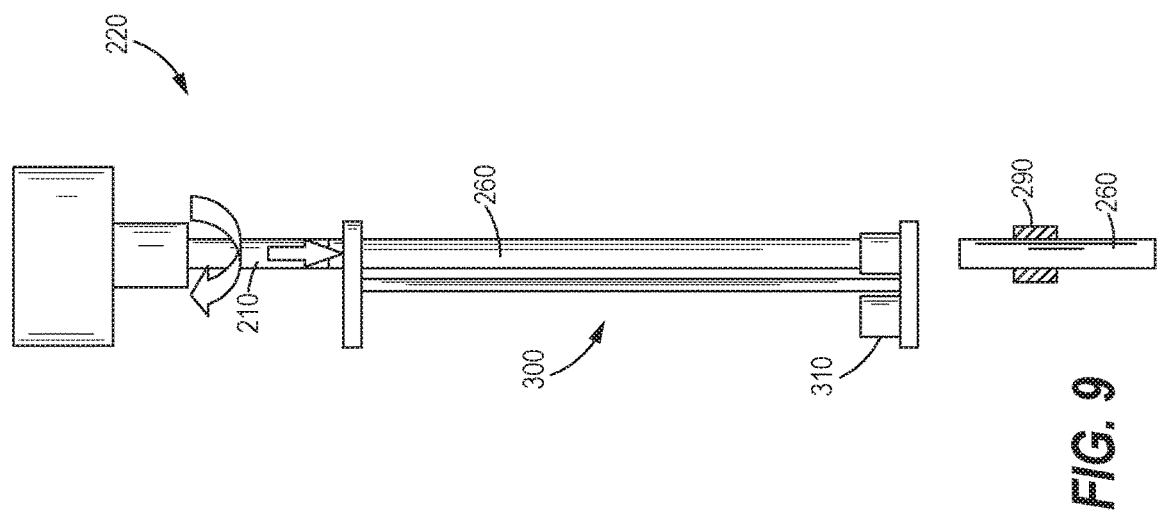
FIG. 9 is a schematic image of a drill string and pipe loader assembly of FIG. 1 in a fifth stage of the pipe addition process, according to the present disclosure.
Figure 12:
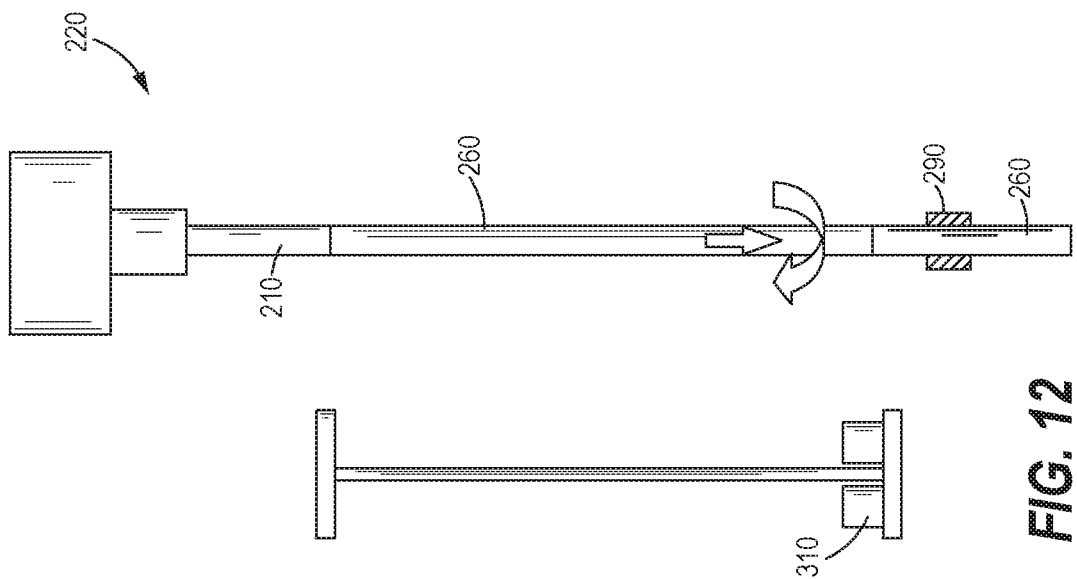
FIG. 12 a schematic image of a drill string and pipe loader assembly of FIG. 1 in an eighth stage of the pipe addition process, according to the present disclosure.
Figure 11:
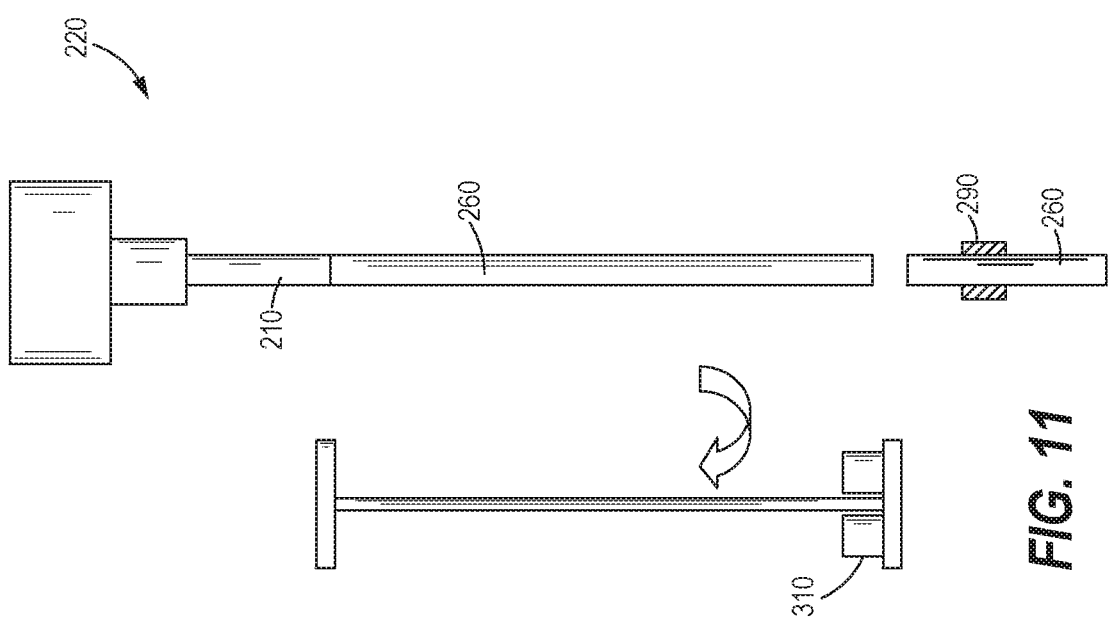
FIG. 11 is a schematic image of a drill string and pipe loader assembly of FIG. 1 in a seventh stage of the pipe addition process, according to the present disclosure.
Figure 13:
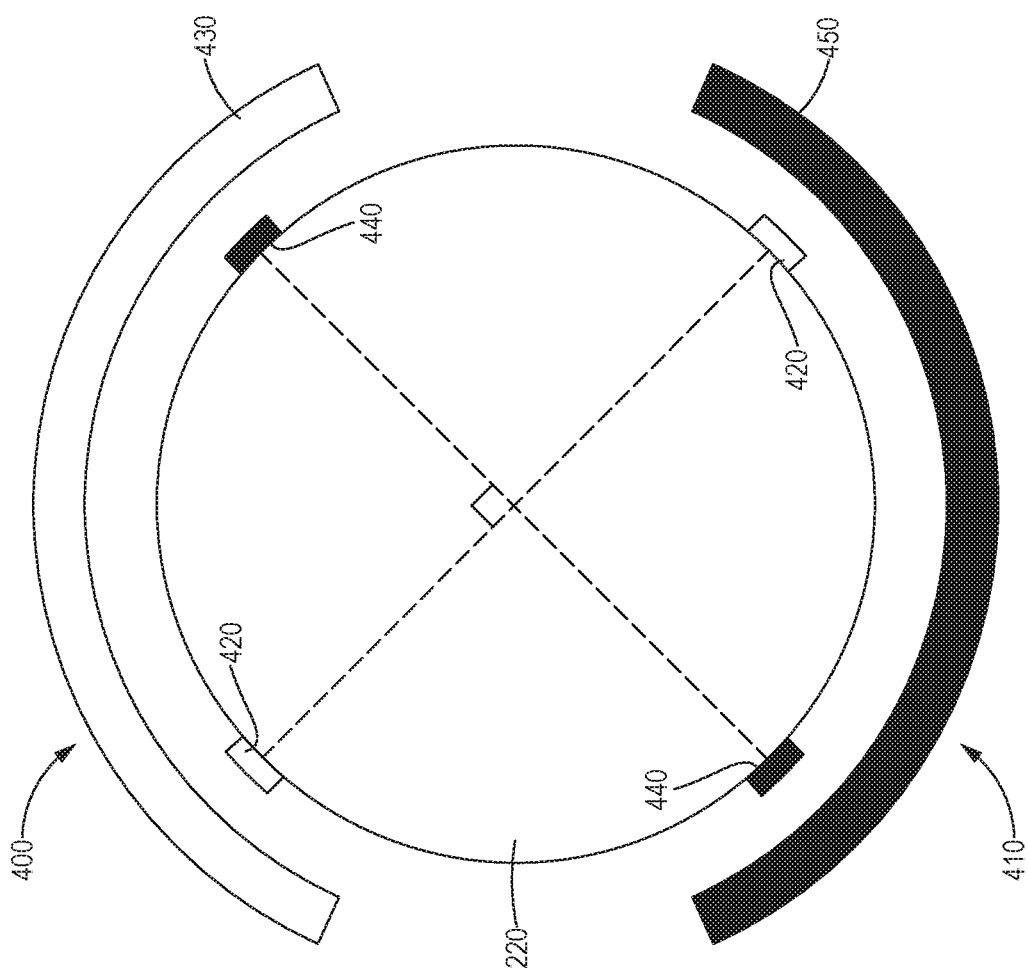
FIG. 13 is a schematic representation of a rotation angle sensor assembly system, according to the present disclosure.

FIGS. 5-12 depict the sequence of steps taken when an additional pipe segment 260 is added to the drill string 220. This operation takes place when the drill string 220 cannot reach to a desired hole depth. First, as shown in FIG. 5, the deck wrench 290 holds a top pipe segment 260 securely at the flattened section 280. If necessary, a pipe loader assembly 300 will rotate to provide a pipe segment 260. FIG. 6 depicts the separation of the rotary head 210 and pipe segment 260. This separation is achieved by rotating the rotary head 210 while the pipe segment is held in place by the deck wrench. The rotary head 210 moves upward as it unthread and decouples from the drill string 220. Next, the rotary head 210 is hoisted up the mast 130 to a position above a pipe loader assembly 300 with a full pipe slot, as shown in FIG. 7. FIG. 8 shows the pipe loader assembly 300 moving the pipe segment 260 into line with the rotary head 210 and drill string 220. In the illustrated embodiment, the pipe loader assembly 300 rotates into position. FIG. 9 depicts the rotary head 210 moving down and rotating to securely screw into the pipe segment 260. The pipe loader assembly 300 prevents the pipe segment 260 from rotating during this step by holding it at the flattened section 280. This allows a secure connection. In some embodiments, sensors in the rotary head 210 may monitor torque to prevent over-tightening. The rotary head 210 and attached pipe segment 260 are lifted upwards slightly (FIG. 10) lifting the pipe segment from the pipe storage slot 310. This provides space for the pipe loader assembly 300 to move back out of the drill string (FIG. 11). Finally, as shown in FIG. 12, the rotary head 210 and pipe segment 260 are moved downwards and rotated in order to couple with the lower portions of the drill string 220. The deck wrench holds the lower portion of the drill string 220 from rotating, creating a secure connection. The deck wrench 290 also prevents the pipe segment 260 from dropping vertically.

A very similar process is used in order to remove a pipe segment 260 when drilling is complete. The rotary head 210 and top pipe segment 260 are separated from the remainder of the pipe string and hoisted to a pipe loader assembly 300 with an empty pipe storage slot 310. The pipe segment 260 is moved into the empty pipe storage slot 310 and then disconnected from the rotary head 210. The rotary head 210 is then lowered and connected to the next pipe segment 260 of the drill string 220.

During these and similar processes performed on the drill string 220, it is vital that the rotational position of the drill string 220 is known. This allows for the flattened section 280 of each pipe segment 260 to be lined up with the deck wrench 290 and pipe loading assembly 300.

The rotational position of the drill string 220 is determined by a first rotation angle sensor assembly 400 and a second rotation angle sensor assembly 410, shown in FIG.

13. The sensor assemblies 400,410 are located at the rotary head 210 and configured to determine the rotational position of the drill string 220 about a longitudinal axis of the drill string 220 such that the alignment of the flattened sections 280 of each pipe segment 260 is known.

The first sensor assembly 400 (shown in white) includes a first magnet set 420 and a first arc sensor 430. The second sensor assembly 410 (shown in black) includes a second magnet set 440 and a second arc sensor 450.

Each magnet set includes two magnets attached to opposite sides of the drill string 220. The first magnet set is offset from the second magnet set by 90 degrees around the central longitudinal axis of the drill string 220.

Each arc sensor 430, 450 is positioned proximate to the drill string 220 such that as the drill string 220 rotates, the arc sensor 430, 450 can sense the position of the associated magnet set 420, 440 moving around the circumference of the drill string 220. The first arc sensor 430 may be located on the opposite side of the drill string 220 to the second arc sensor 450. The arc sensors 430, 450 are located such that the first arc sensor 430 cannot sense the second magnet set 440 and the second arc sensor 450 cannot sense the first magnet set 420. This may be accomplished by offsetting the sensor assemblies 430, 450 along the longitudinal axis of the drill string 220.

Figure 14:
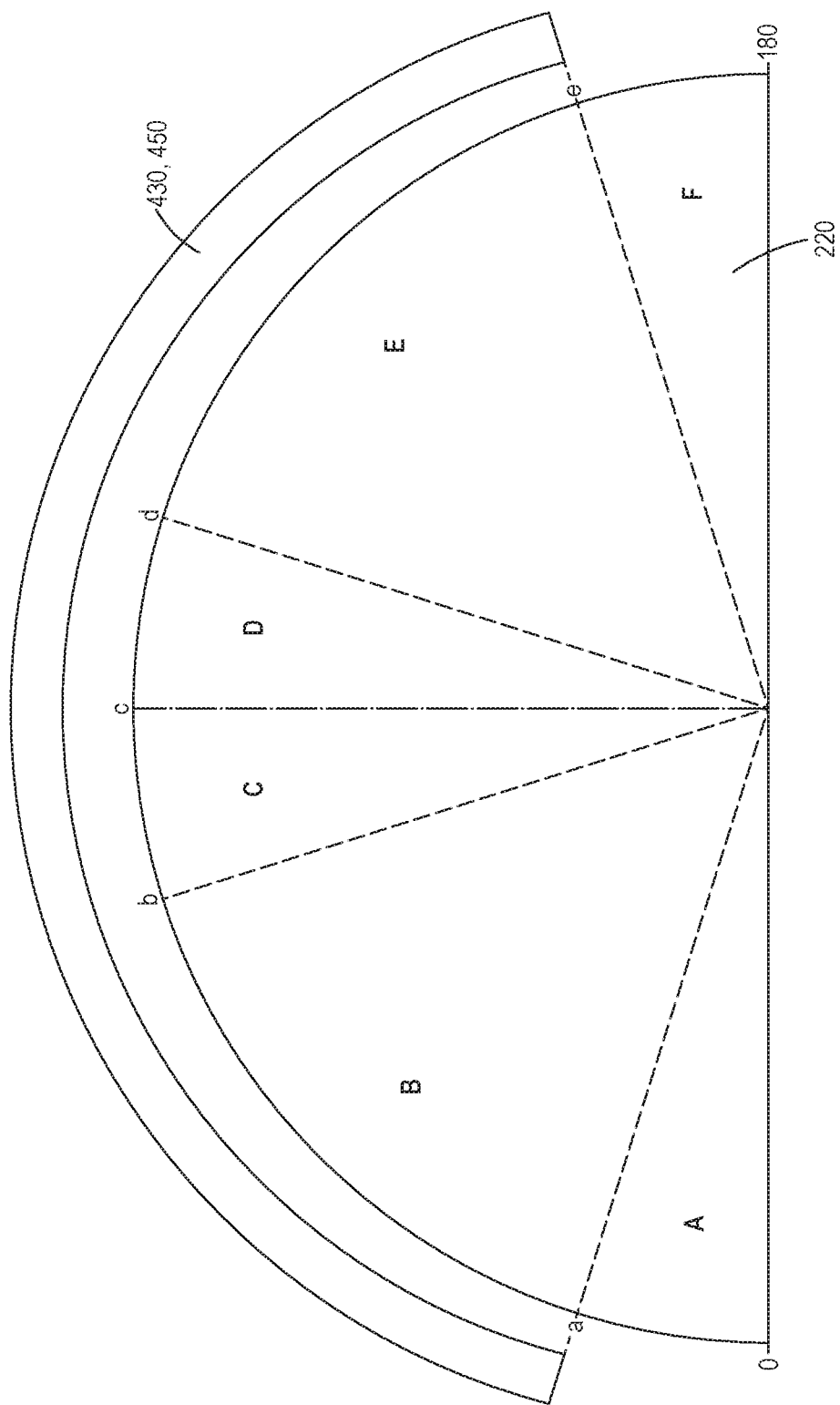
FIG. 14 is a diagrammatic representation of the sensing range of one embodiment of a rotation angle sensor assembly system, according to the present disclosure.

The arc sensors are configured to determine the location of a magnet set and therefore the rotational angle of the drill string 220. Each arc sensor 430, 450 can "see" the associated magnet set 420, 440 in a sensor range of less than 180 degrees. In one embodiment, the arc sensors may have a sensor range of 145 degrees, but other sensors ranges between 90 and 180 are possible. FIG. 14 depicts the sensor range of an arc sensor with a visible range of 145 degrees centered between 0 and 180 degrees. In that embodiment, the visible range is from 17.5-162.5 degrees, depicted as regions B-E.

Because the magnets in a set 420, 440 are located 180 degrees from each other, the arc sensor 430, 450 can only see up to one magnet at a time. Furthermore, there is a hidden range in which the arc sensor cannot determine the position of either magnet. The hidden ranges are shown in FIG. 14 as regions A and F. In the embodiment in which the sensor range is 145 degrees, the hidden ranges are from 0-a and e-180 or 0-17.5 degrees and 162.5-180 degrees However, because the first magnet set 420 and the second magnet set, 440 are offset by 90 degrees, if one magnet set is in a hidden range, the second magnet set will be visible in a non-intersecting range. Specifically, if the first magnet set 420 is in region A of the first arc sensor 430, the second magnet set 440 will be visible to the second arc sensor 450 in a non-intersecting range shown as region C. Similarly, if the first magnet set 420 is in region F of the first arc sensor 430, the second magnet set 440 will be visible to the second arc sensor 450 in a region D. In the illustrated embodiment in which the sensor range is 145 degrees, the non-intersecting range is from b-d or 72.5-107.5 degrees.

In addition, there will be an intersecting range in which both the first and second arc sensor can locate an associated magnet. Specifically, if the first magnet set 420 is in region B of the first arc sensor 430, the second magnet set 440 will be visible to the second arc sensor 450 in a region D. In the illustrated embodiment in which the sensor range is 145 degrees, the intersecting ranges are from a-b or 17.5-72.5 degrees and d-e or 107.5-162.5 degrees.

In an alternative embodiment not illustrated, the arc sensors 430, 450 may be offset by a degree other than 180. In that case, the magnet sets should be offset by 90 degrees relative to whatever the arc sensors 430, 450 are offset by. Furthermore, in another alternative embodiment, additional arc sensors and magnet sets may be utilized, and the arc sensors and magnets may then have different sensor ranges and offsets.

Figure 15:
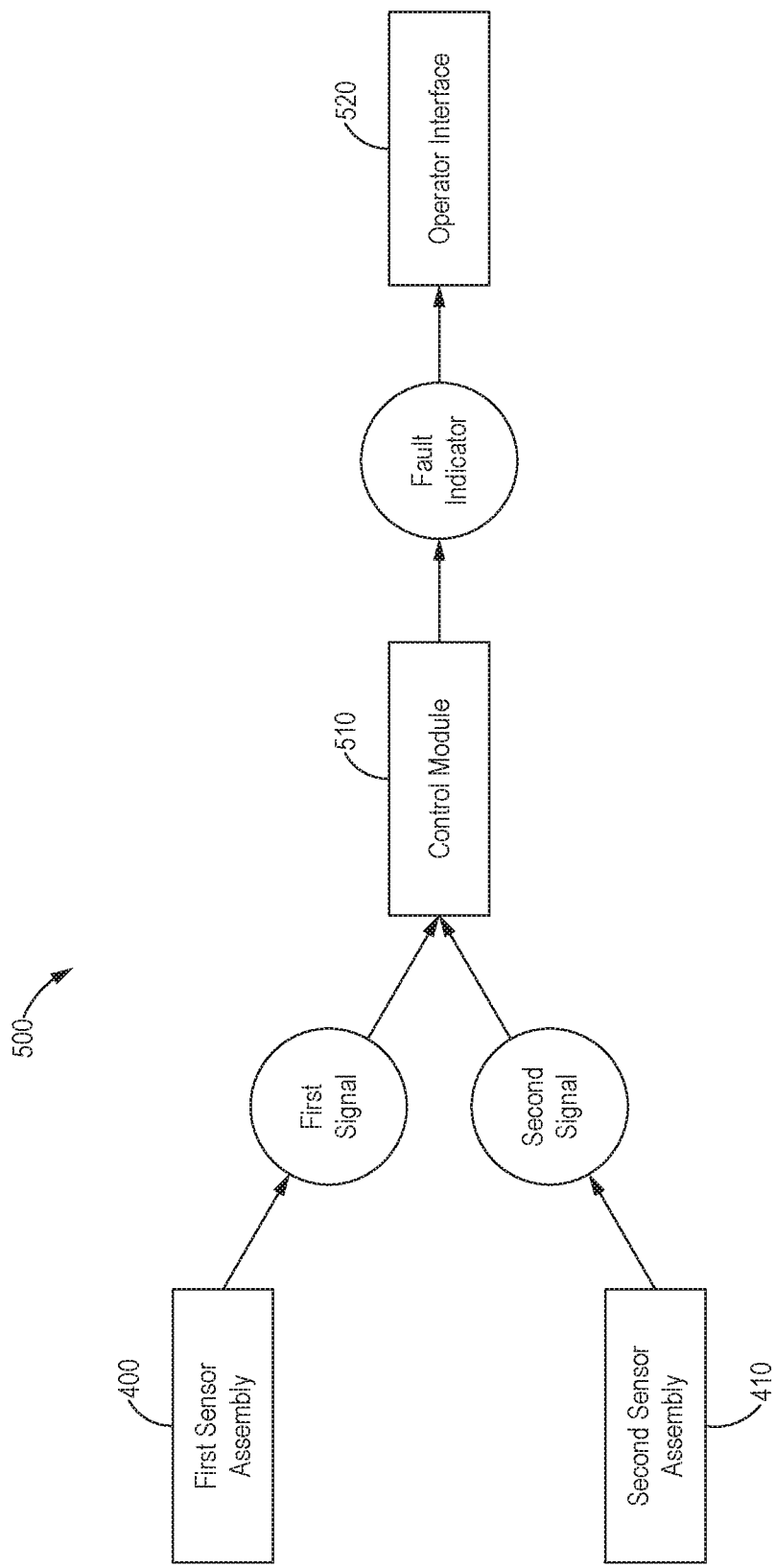
FIG. 15 is a schematic representation of a rotation angle sensing diagnostics system, according to the present disclosure.

Because the rotational angle is highly significant, it is vital to know if a sensor assembly is malfunctioning. This can be achieved with a diagnostic system, as depicted in FIG. 15. The diagnostic system 500 includes the first sensor assembly 400, the second sensor assembly 410, a control module 510, and an operator interface 520. The control module 510 is configured to receive a first signal from the first sensor assembly 400 and receive a second signal from the second sensor assembly 410, then determine if a valid state exists based on those signals. If a valid state does not exist, the control module 510 indicates a fault on the operator interface 520. The signals from the first sensor assembly 400 and the second sensor assembly 410 may be either a value in degrees indicating the rotational position of the magnet seen by the associated arc sensor or "null" if the magnets are in the hidden range. In some embodiments, the control module may further based the determination of a valid state on a signal history according to an algorithm.

A valid state exists if: a) one signal is null and the other signal indicates a value within the non-intersecting range, or b) one signal is in the intersecting range, the other signal is also in the intersecting range, and the difference between the two signal values is 90 degrees.

In the embodiment where the arc sensor range is 145 degrees, the valid states are a) one signal is null and the other signal is between 55 and 125 degrees or b) one signal is between 35 and 55 degrees and the other signal is between 125 and 145 degrees with a difference between the signal values of 90 degrees.

The control module 510 may further be configured to provide the degree of fault by determining how far out of alignment the magnets may be. The diagnostic system may have a tolerance of 5-6% or approximately 10 degrees. These details may be displayed on the operator interface 520.

The signal from the sensors to the control module may be a pulse width modulation type signal providing a constant frequency. The duty cycle of the frequency provides the orientation of the magnets relative to the sensor. The control module may also be configured to detect specific fault types related to one sensor including but not limited to internal faults, shorts, and open circuits.

INDUSTRIAL APPLICABILITY

Figure 16:
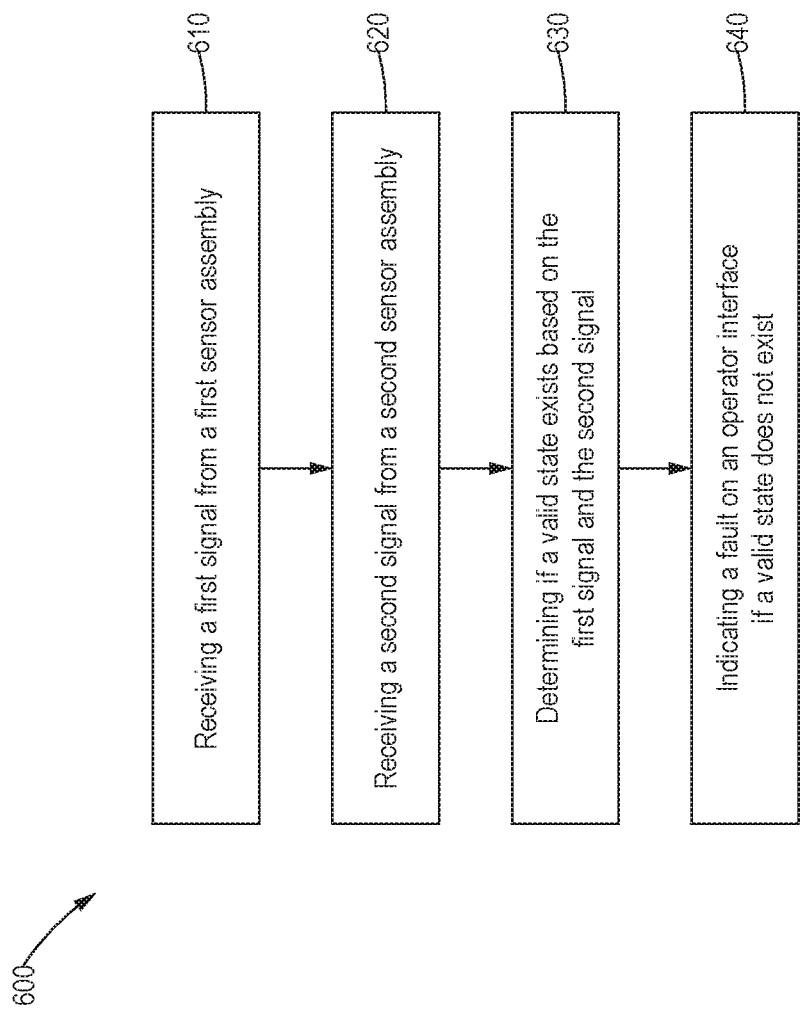
FIG. 16 is a flowchart representation of a method of providing a rotation angle sensing diagnostics system for a drilling machine, according to the present disclosure.

In many applications, but particularly in drilling applications, it is vital to know the precise rotational angle of a component in order to correctly align the component with other elements. One form of sensing system uses magnets and an arc sensor which allows for free rotation at the same time as knowing the rotational angle. Because the accuracy of this measurement is so important, a diagnostic method is required. This diagnostic method, described below and shown in FIG. 16, can be used in combination with the magnetic rotational angle sensing system on any application which requires precise knowledge of rotational position, particularly drilling in the mining and construction industries.

The diagnostic method 600 includes receiving a first signal from a first sensor assembly (block 610), receiving a second signal from a second sensor assembly (block 620), determining if a valid state exists based on the first signal and the second signal (block 630), and indicating a fault on an operator interface if a valid state does not exist (block 640).

A valid state exists if: a) one signal is null and the other signal indicates a value within the non-intersecting range, or b) one signal is in the intersecting range, the other signal is also in the intersecting range, and the difference between the two signal values is 90 degrees. The method may further include indicating the degree of error if possible. The method may further include determining valid states based on the signal history.

While the preceding text sets forth a detailed description of numerous different embodiments, is should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A drill string rotation angle sensor diagnostic system, comprising:
    a first rotation angle sensor assembly comprising a first arc sensor and a first magnet set;
    a second rotation angle sensor assembly comprising a second arc sensor and a second magnet set;
    an operator interface; and
    a control module configured to:
        receive a first signal from the first rotation angle sensor assembly,
        receive a second signal from the second rotation angle sensor assembly,
        determine if a valid state exists based on the first signal and the second signal, and
        indicate a fault on the operator interface if a valid state does not exist,
    wherein a valid state exists if:
        the first signal is null and the second signal indicates a value within a non-intersecting range, or
        the first signal indicates a value in an intersecting range, the second signal indicates a value in the intersecting range, and the difference between the two signal values is 90 degrees.

2. The diagnostic system of claim 1, wherein the arc sensors have a sensor range of less than 180 degrees.

3. The diagnostic system of claim 1, wherein the arc sensors have a sensor range of 145 degrees.

4. The diagnostic system of claim 1, wherein the magnets of the first sensor assembly are offset from the magnets of the second sensor assembly by 90 degrees.

5. The diagnostic system of claim 1, wherein the control module is further configured to display details of the fault on the operator interface.

6. The diagnostic system of claim 1, wherein the first rotation angle sensor assembly and the second rotation angle sensor assembly are offset along a drill string longitudinal axis.

7. A method of advanced diagnostics for a drill string rotation angle sensing system, comprising:
    receiving a first signal from a first rotation angle sensor assembly comprising a first arc sensor and a first magnet set;
    receiving a second signal from a second rotation angle sensor assembly comprising a second arc sensor and a second magnet set;
    determining if a valid state exists based on the first signal and the second signal; and
    indicating a fault on an operator interface if a valid state does not exist
    wherein a valid state exists if:
        the first signal is null and the second signal indicates a value within a non-intersecting range, or
        the first signal indicates a value in an intersecting range, the second signal indicates a value in the intersecting range, and the difference between the two signal values is 90 degrees.

8. The method of claim 7, wherein the arc sensors have a sensor range of less than 180 degrees.

9. The method of claim 7, wherein the arc sensors have a sensor range of 145 degrees.

10. The method of claim 7, wherein the magnets of the first sensor assembly are offset from the magnets of the second sensor assembly by 90 degrees.

11. The method of claim 7, wherein the first rotation angle sensor assembly and the second rotation angle sensor assembly are offset along a drill string longitudinal axis.

12. A drilling machine, comprising:
    a frame;
    a mast mounted on the frame;
    a rotary head movably mounted on the mast;
    a drill string coupled to the rotary head and aligned within the mast;
    a first rotation angle sensor assembly monitoring a rotational position of the drill string, the first rotation angle sensor comprising a first arc sensor and a first magnet set;
    a second rotation angle sensor assembly monitoring the rotational position of the drill string, the second rotation angle sensor comprising a second arc sensor and a second magnet set;
    an operator interface; and
    a control module configured to:
        receive a first signal from the first rotation angle sensor assembly,
        receive a second signal from the second rotation angle sensor assembly,
        determine if a valid state exists based on the first signal and the second signal, and
        indicate a fault on the operator interface if a valid state does not exist,
    wherein a valid state exists if:
        the first signal is null and the second signal indicates a value within a non-intersecting range, or
        the first signal indicates a value in an intersecting range, the second signal indicates a value in the intersecting range, and the difference between the two signal values is 90 degrees.

13. The machine of claim 12, wherein the arc sensors have a sensor range of less than 180 degrees.

14. The machine of claim 12, wherein the arc sensors have a sensor range of 145 degrees.

15. The machine of claim 12, wherein the magnets of the first sensor assembly are offset from the magnets of the second sensor assembly by 90 degrees.

16. The machine of claim 12, wherein the control module is further configured to display details of the fault on the operator interface.

17. The machine of claim 12, wherein the first rotation angle sensor assembly and the second rotation angle sensor assembly are offset along a drill string longitudinal axis.

\* \* \* \* \*